Feb. 17, 1931.                    M. S. TROP                    1,793,263
                    APPARATUS FOR MAKING CHOCOLATE CHERRIES
                    Filed Dec. 4, 1928          2 Sheets-Sheet 1
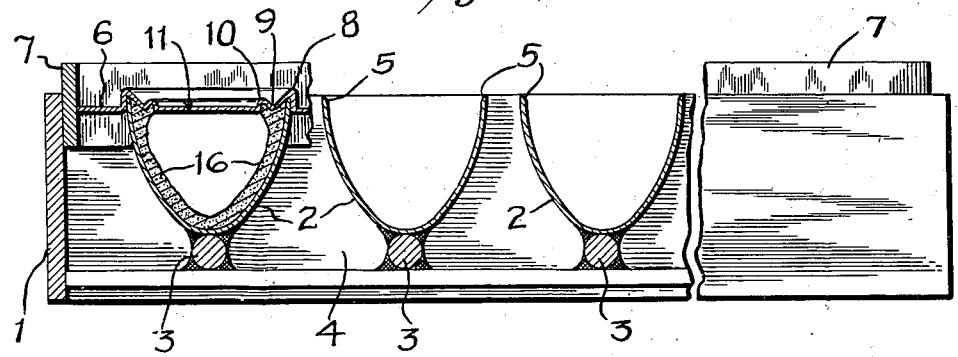
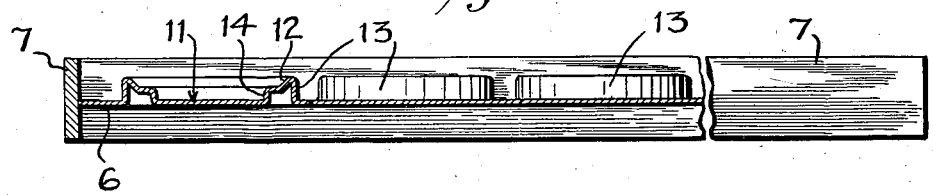
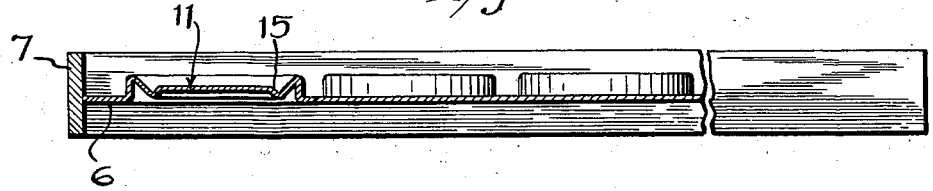
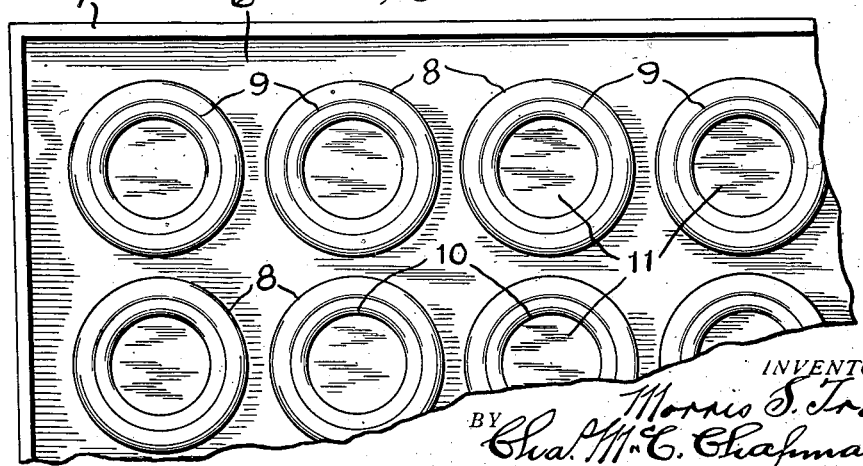

Feb. 17, 1931.  M. S. TROP  1,793,263
APPARATUS FOR MAKING CHOCOLATE CHERRIES
Filed Dec. 4, 1928  2 Sheets-Sheet 2
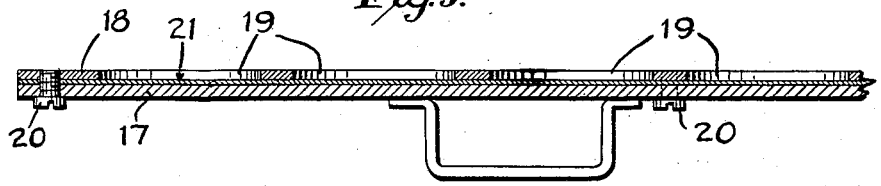
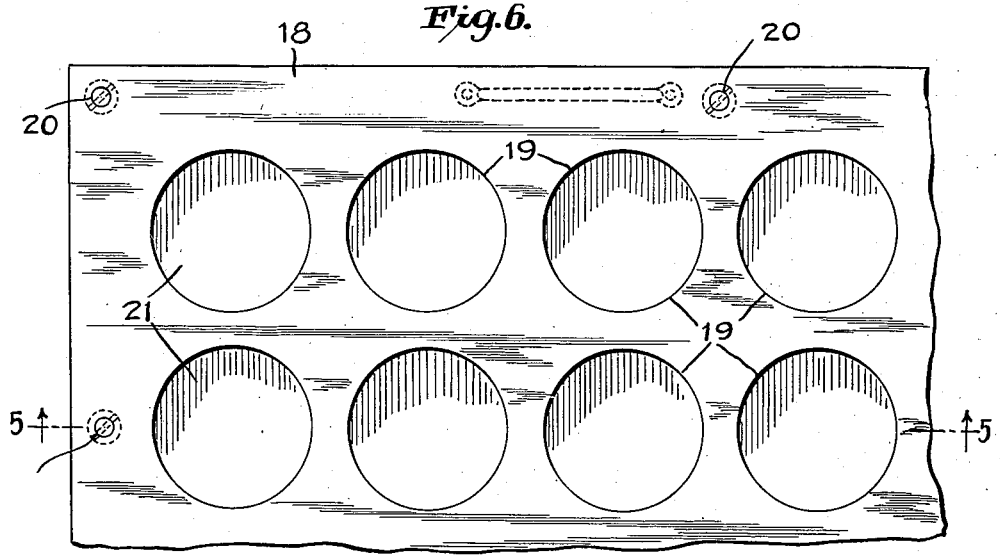
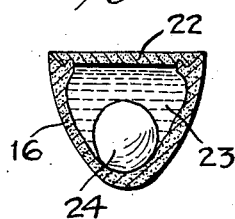
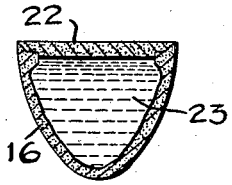
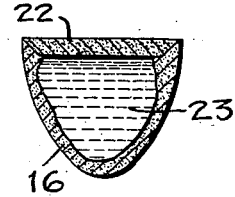
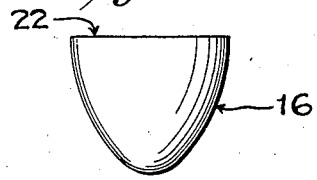
INVENTOR:
Morris S. Trop
BY Chas. M. C. Chapman
ATTORNEY Patented Feb. 17, 1931

1,793,263

UNITED STATES PATENT OFFICE

MORRIS S. TROP, OF WOODMERE, NEW YORK

APPARATUS FOR MAKING CHOCOLATE CHERRIES

Application filed December 4, 1928. Serial No. 323,607.

This invention has reference to the art of confections, sweetmeats, filled candies and so-called chocolate cherries. Particularly, my invention relates to an apparatus by means of which confections of the kind stated can be made homogeneous, perfectly sealed, uniform, and in a manner such as to reduce liability of seepage, leakage or oozing of the fluid contents of the homogeneous chocolate shell.

Among the objects of my invention may be noted the following: to provide an apparatus by means of which a chocolate shell can be made with two parts the meeting margins of which can be sealed with an interlocking joint; to provide an apparatus for making homogeneous chocolate shells which produces the latter with an interlocking joint without the application of heat to the interlocked margins; to provide an apparatus with interacting members adapted to produce chocolate cherries and chocolate shells of the nature noted in the foregoing which is simple, strong, durable, economical to make and capable of being manipulated facilely, rapidly and effectively without skilled workmen; to provide an apparatus of the kind and for the purposes noted in the foregoing composed of only three principal parts which are made to interact so as to produce the functions desired and result in the article of homogeneous character specified; and to provide simple apparatus of the nature noted in the foregoing, the details of construction of which may be varied to a considerable extent for producing the interlocking joint between the shell and its sealing member.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 1 is a view showing a portion of my shell mold carrier in sectional elevation, one of the shell molds showing a chocolate shell therein, as having been formed by two of the interacting parts;

Figure 2 is a view similar to Figure 1 showing, however, only the matrix mold-plate which gives the desired form to the margin of the chocolate shell;

Figure 3 is a view similar to Figure 2 showing another form of my invention embodied in a matrix mold-plate;

Figure 4 is a plan view of a portion of the matrix mold-plate shown in Figure 1, the parts broken away being due to the limitations of the sheet;

Figure 5 is a sectional view of a sealing plate employed for the purpose of applying the sealing member to the margin of the chocolate shell after being formed by the matrix mold-plate;

Figure 6 is a plan view of the structure of Figure 5, the same being curtailed as in Figure 5 due to the limitations of the sheet;

Figures 7, 8 and 9 are vertical sectional views of chocolate shells, the marginal edges of which have been treated by different forms of matrix mold-plates for the purpose of producing the interlocking joint between the chocolate shell and its bottom or sealing member; and Figure 10 is a side elevation of a completed chocolate cherry or confection, showing its homogeneous nature and the complete seal between the parts thereof.

Heretofore it has been proposed, in making filled confections such as chocolate cherries and the like, to mold the same in a manner such that there is no real seal nor closed joint which will prevent the contents of the confection from seeping, oozing or leaking under conditions of packing, handling, transportation and storage. The foregoing fact has made confections of the type noted quite objectionable, uncommercial and well-nigh impossible of production, save by hand processes which are tedious, lengthy and expensive. The cost of such productions has made the sale of the product well-nigh impossible, and such production has been very unsatisfactory because leakage and oozing have soiled the boxes and other packages, and have made them very disagreeable and unclean to handle; and the loss of contents has created considerable trouble, complaint and suspension of manufacture by known processes and apparatus.

My apparatus overcomes all the objections noted in the foregoing and produces the novelty of a confection such as noted, or a chocolate cherry with an interlocking joint constituting a perfect seal, and this, without the necessity of using heat at the interlocking joints during the process of producing the confections.

My improved apparatus is disclosed in the accompanying drawings and therein, referring to Figures 1 to 4, inclusive, the numeral 1 indicates the rectangular frame of the carrier for the shell-molds indicated at 2, said molds being arranged in parallel rows in a frame of a size convenient for manipulation. The shell-molds are arranged in the frame or carrier with their open ends upwardly and their lower ends supported on cross-bars 3, which are secured in the side bars 4 of the carrier or frame. The upper edges or marginal edges at the mouth of the shell-molds are made sufficiently sharp, as indicated at 5, to constitute cutting edges adapted to penetrate the substance of the sealing member for the chocolate shell hereinafter described. As is well known, the limpid chocolate is poured into the shell-molds 2, allowed to set or chill, and the surplus inside the shell-mold is then poured or shaken out, leaving a chocolate shell clinging to the interior wall of said mold, into which chocolate shell the filling or cherry or what not is poured as a preliminary to sealing the shell.

After the chocolate shell is thus formed in the shell-molds, and before they become hard or brittle, the marginal edges of the chocolate shells are treated by the matrix mold-plates such as shown in Figures 1 to 4 of the drawings. The matrix mold-plates are formed in a series corresponding exactly with the series of shell-molds, and said matrix molds are formed in a plate 6 rigidly held between the upper and lower edges of a rectangular frame 7 constituting the matrix mold-plate. Each of the matrices is formed by stamping the plate 6 so as to produce, for example, a mold-plate of the conformation shown in Figure 1. In this figure a circumferential V-shaped member 8 is produced merging into an obtuse angular groove 9 which produces, together with the member 8, a spread V-shaped groove in the marginal edge of the chocolate shell. The wall of the groove 9 is extended into an inverted U-shaped portion 10 from the outer wall of which is extended the central flattened disk-like member 11. The conformation of the matrix mold just described extends, of course, circularly so as to correspond with the cutting edge of the shell-molds 2, said cutting edge extending into and cooperating with the inverted V-shaped member 8. Thus the matrix mold-plate gives to the marginal edge of the chocolate shell, while in the shell-mold 2, the configuration shown, for example, in Figure 7, thus preparing said marginal edge of the chocolate shell for the reception of the sealing member.

In Figure 2, the matrix mold-plate is given a different configuration, in that the outer surface thereof is formed into a widespread obtuse angle, as indicated at 12, the outer leg of which merges into a vertical wall 13 and the inner leg of which merges into a shorter vertical wall 14 terminating in the central flattened disk-like member 11.

In Figure 3 the matrix mold-plate is given a conformation similar to that of Figure 1, save that the leg 15 of the obtuse angular groove terminates in the central flattened disk-like member 11. In all three forms of my matrix mold-plate, the rectangular frame 7 is made with its outer periphery corresponding approximately with the inner periphery of the rectangular frame of the carrier for the shell-molds, whereby the said frame 7 may slide freely within the frame 1 and be guided by the latter, so that the cutting edges of the shell-molds will accurately enter the outer groove of the matrix mold-plate, so that the latter can be made to give to the marginal edges of the chocolate shells the proper conformation for interlocking engagement with the sealing member.

It will be understood that when the shell of chocolate, indicated at 16, has sufficiently set; but, while it is still in a soft and plastic condition, in the shell-molds, the shell-mold carrier is inverted upon the matrix-mold plate, or the latter can be first firmly pressed down upon the shell-molds and the two,— plate and carrier,— inverted and the shell-molds firmly pressed upon the plate so as to give to said plastic marginal edges of the chocolate shells 16 the desired conformation. In this condition of the parts, the soft and plastic shell 16 will settle down in and upon the matrix-molds, and the marginal edges of the chocolate shells 16 will partake of the shape of the matrix-molds and conform thereto and become smooth and uniform without the necessity of scraping the same. When the chocolate shells have become sufficiently set under this treatment, the carrier and plate will be separated and the sealing plate, shown in Figures 5 and 6, will be applied to the shell-molds and the sealing member to the margins of the chocolate shell therein, as now about to be described.

In Figure 5 and 6, the sealing plate is shown to consist of the base-plate 17, and the cup-plate 18 which is provided with a plurality of openings 19 corresponding in number, form and size, as well as arrangement, to the shell-molds 2, the openings being sufficiently deep to receive enough chocolate to make a sealing member for the open end of the chocolate cherry shown, for example, in Figure 7. Plates 17 and 18 are secured rigidly together by a plurality of screws 20 of sufficient number to hold them tightly surface-to-surface and to firmly grip between them a piece of heavy, glazed or greased paper upon which through the openings 19 the limpid chocolate for sealing purposes is poured. The paper 21 is held by the screws 20 passing through it, as well as between the two plates 17 and 18. The paper may be of a character such that the limpid chocolate will not adhere thereto, or the surface of the paper exposed in the openings 19 may be waxed or paraffined. Thus, when the chocolate sealing member formed in the cups 19 has sufficiently set or become chilled, the sealing plate can be removed from the shell-molds 2 without dragging upon or fracturing the sealing members shown in Figures 7, 8 and 9, and indicated at 22. It will be readily understood that after the chocolate shell 16 has been formed in the shell-molds and the marginal edges of said chocolate shells have been treated by the matrix mold-plates, chocolate will be poured into the cups 19 upon the paper 21 and when the same has sufficiently chilled to be soft or plastic, the sealing plate will be inverted upon the shell-molds, the sharp edges of which will cleave the walls of the cups and the sealing members 22 will enter the chocolate shells and be pressed into the grooves of the marginal edges of the latter and allowed to coalesce and tightly adhere, so as to interlock therewith and become perfectly homogeneous with the chocolate shells. While the shell-mold carrier and sealing plate are together, they can be subjected to chilling apparatus, or a chilling process, to aid in setting and hardening the chocolate-shells as a whole. The sealing plate can then be removed without pull or drag upon the sealing member 22, which will not adhere to the surface 21, nor to the walls of the cups for the reasons previously described.

In Figures 7, 8 and 9, I have shown chocolate confections whose marginal edges of the chocolate shells have been sealed by members 22, and in said figures the conformation of the said marginal edges, as well as the marginal edges and adjacent surface of the sealing members 22 have been accentuated in order to demonstrate my invention. Literally, when the confection is completed, as shown in Figure 10, it will be found that the sealing member 22 has coalesced with the chocolate shell so intimately as to leave no appearance of the line of juncture, demonstrating the fact that the two members of the confection have become homogeneous. In Figures 7, 8 and 9, the chocolate shells are shown to have a filling 23, and in Figure 7 a cherry 24, or other fruit, is indicated.

From the foregoing it will be understood that I have produced a chocolate confection, entirely homogeneous, without the aid of heat, heating irons or heating members, to produce the seal between the shell 16 and the sealing member 22. This is a feature of great importance in my invention which involves in its generic idea of method a cold process for making chocolate confections. By this I mean that I have found it to be unnecessary to use heat to preliminarily soften the marginal edges of the chocolate shell 16 in applying the sealing member 22; for, I have found that, with the marginal edge or edges of the chocolate shells, grooved as shown in Figures 7, 8 and 9, for example, I can apply the sealing member 22 and produce an interlock with the chocolate shell by a cold process as heretofore described. This is an important feature of my invention, as is also the homogeneous chocolate confection or so-called "cherry", and I purpose claiming both the method and the article in another application of future date.

As described above with reference to the matrix mold-plate, the dimensions of the sealing plate are such as to enable it to slide freely within the frame 1 of the shell-molds; and to manipulate the sealing plate it may have applied thereto within its margins a couple of handles secured to the base member 17, said handles being of any form desired enabling the operator to manipulate the sealing plate as required. The use of the paper bottom for the cups of the sealing plate, that is to say, the fibrous glazed material between the plates 17 and 18, has the additional important function of being capable of yielding sufficiently under pressure applied to the sealing plate to permit the escape of air such as may be confined by the sealing member 22 when applied to the chocolate shell-mold during the process of sealing the latter. In other words, the glazed or fibrous material 21 will yield under pressure applied to the sealing plate, so as to permit the escape of air bubbles between it and the cup-plate 18, if air happens to be trapped between the sealing member 22 and the chocolate shell or its marginal edges. This is an important feature, since all air is eliminated from the interior of the confection, resulting in enabling the hermetical sealing of the confection, making it homogeneous and avoiding subsequent leakage, seeping or oozing of the contents of the confection.

Having thus described my invention, what I claim and desire to secure by Letters Patent is:

1. An apparatus for making confections having in combination, a frame carrying a plurality of shell-molds, in combination with a sealing plate having a plurality of cups each adapted to receive a shell-mold and the bottoms of which are formed of glazed, non-adhesive material.

2. A matrix mold-plate, comprised in an apparatus for making homogeneous confections, having a plurality of mold sockets having flat centers, each of said sockets having its walls corrugated to produce a plurality of concentric angles and grooves.

3. A sealing plate for an apparatus adapted to produce chocolate confections, comprising a base-plate, a cup-plate, and a non-adhesive material inserted between and firmly held by the said two plates.

4. A mold-plate for apparatus for making confections comprising a plurality of molds having flat centers the marginal edges of which are grooved, and the walls of the grooves terminating in flat external body members constituting the supporting means for the molds.

5. A sealing plate for apparatus for making chocolate confections, comprising a plate having a plurality of openings therethrough, a solid base-plate, and means for securing the same to the first-named plate to form the bottom of the openings therein, in combination with a fibrous material having a non-adhesive surface applied between the plates and forming the bottom of the said openings.

6. An apparatus for making confections comprising a shell-mold having its edges sharpened, and a matrix mold-plate having a cup composed of a flat central member surrounded by a plurality of concentric projections, one of which is adapted to engage the edges of the shell-mold, and another of which is adapted to project into the latter.

MORRIS S. TROP.